United States Patent
Kim et al.

(10) Patent No.: US 10,050,280 B2
(45) Date of Patent: Aug. 14, 2018

(54) COMPOSITE ELECTRODE FOR LITHIUM AIR BATTERY, METHOD OF PREPARING THE ELECTRODE, AND LITHIUM AIR BATTERY INCLUDING THE ELECTRODE

(71) Applicant: Samsung Electronics Co., Ltd., Suwon-si, Gyeonggi-do (KR)

(72) Inventors: Taeyoung Kim, Seoul (KR); Victor Roev, Suwon-si (KR); Kihyun Kim, Seoul (KR); Sangbok Ma, Suwon-si (KR); Minsik Park, Hwaseong-si (KR); Dongjoon Lee, Yongin-si (KR); Myungjin Lee, Seoul (KR); Dongmin Im, Seoul (KR); Wonsung Choi, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 385 days.

(21) Appl. No.: 14/551,588

(22) Filed: Nov. 24, 2014

(65) Prior Publication Data
US 2015/0155566 A1    Jun. 4, 2015

(30) Foreign Application Priority Data
Nov. 29, 2013    (KR) .................. 10-2013-0147990

(51) Int. Cl.
*H01M 4/88*    (2006.01)
*H01M 12/08*    (2006.01)
(Continued)

(52) U.S. Cl.
CPC ............... *H01M 4/88* (2013.01); *H01M 4/86* (2013.01); *H01M 4/8663* (2013.01);
(Continued)

(58) Field of Classification Search
CPC ........ H01M 4/88; H01M 4/86; H01M 4/8663; H01M 4/9083; H01M 12/08; H01M 2300/091; Y02E 60/50
(Continued)

(56) References Cited

U.S. PATENT DOCUMENTS

| 2012/0261612 A1* | 10/2012 | Suh ................. B82Y 30/00 |
| | | 252/182.3 |
| 2014/0088207 A1* | 3/2014 | Elabd ................. B01J 41/00 |
| | | 521/27 |
| 2015/0155594 A1 | 6/2015 | Lee et al. |

FOREIGN PATENT DOCUMENTS

CN    102227034 A    10/2011
CN    102544634 A    7/2012
(Continued)

OTHER PUBLICATIONS

Ye et al. "Li Ion Conducting Polymer Gel Electrolytes Based on Ionic/PVDF-HFP Blends". Available Sep. 21, 2007. Journal of the Electrochemical Society, 154 (11) A1048-1057. Total Pages 10.*

(Continued)

*Primary Examiner* — Harold Pyon
*Assistant Examiner* — Danny N Kang
(74) *Attorney, Agent, or Firm* — Cantor Colburn LLP

(57) ABSTRACT

A composite electrode for a lithium air battery including: i) a polymerization product of a first heteroatom-containing ionic liquid or ii) a mixture of a second heteroatom-containing ionic liquid and a polymer ionic liquid represented by Formula 1:

Formula 1

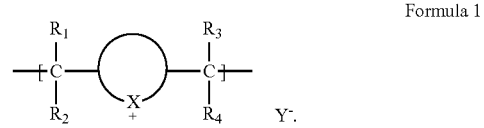

17 Claims, 2 Drawing Sheets

(51) Int. Cl.
　　　*H01M 4/00*　　　(2006.01)
　　　*H01M 4/90*　　　(2006.01)
　　　*H01M 4/86*　　　(2006.01)

(52) U.S. Cl.
　　　CPC ......... *H01M 4/9083* (2013.01); *H01M 12/08* (2013.01); *H01M 2300/0091* (2013.01); *Y02E 60/128* (2013.01)

(58) Field of Classification Search
　　　USPC .................................................. 252/500, 514
　　　See application file for complete search history.

(56) References Cited

FOREIGN PATENT DOCUMENTS

| | | | |
|---|---|---|---|
| JP | 2012113929 A | | 6/2012 |
| KR | 1020130008830 A | | 1/2013 |
| KR | 1020130046247 A | | 7/2013 |
| KR | 101309240 B1 | * | 9/2013 |
| KR | 1020150064763 A | | 6/2015 |
| WO | 2011086701 A1 | | 7/2011 |

OTHER PUBLICATIONS

Ye et al., "Li Ion conducting Polymer Gel Electrolytes Based on Ionic Liquid/PVDF-HFP Blends", Journal of The Electrochemical Society, 154(11), 2007, pp. A1048-A1057.
Zhang et al., "From Li-O2 to Li-Air Batteries: Carbon Nanotubes/Ionic Liquid Gels with a Tricontinuous Passage of electrons, Ions, and Oxygen**", Angew. Chem. Int. Ed., 51, 2012, pp. 11062-11067.
Zhang et al., "Ambient operation of Li/Air Batteries", Journal of Power Sources, 195, 2010, 4332-4337.

* cited by examiner

COMPOSITE ELECTRODE FOR LITHIUM AIR BATTERY, METHOD OF PREPARING THE ELECTRODE, AND LITHIUM AIR BATTERY INCLUDING THE ELECTRODE

CROSS-REFERENCE TO RELATED APPLICATION

This application claims priority to Korean Patent Application No. 10-2013-0147990, filed on Nov. 29, 2013, in the Korean Intellectual Property Office, and all the benefits accruing therefrom under 35 U.S.C. § 119, the content of which is incorporated herein in its entirety by reference.

BACKGROUND

1. Field

The present disclosure relates to a composite electrode for a lithium air battery, a method of preparing the composite electrode, and a lithium air battery including the composite electrode.

2. Description of the Related Art

A lithium air battery includes a negative electrode capable of intercalating/deintercalating lithium ions; a positive electrode including an oxidation and reduction catalyst for oxygen as a positive electrode active material; and a lithium ion conductive medium disposed between the positive electrode and the negative electrode.

A theoretical energy density of the lithium air battery is 3,000 Wh/kg or greater, which is higher than that of a lithium ion battery. The lithium air battery is environment-friendly, and its stability is better than that of the lithium ion battery.

In a lithium air battery containing a liquid electrolyte, a large amount of the liquid electrolyte is used to fill the pores of the positive electrode, leading to an increase in a total weight of the cells. Thus, a lithium air battery having a high energy density is difficult to manufacture. In order to overcome this problem, a solid electrolyte may be added to an electrolyte in the positive electrode.

However, the existing solid electrolytes readily react with a discharge product of the lithium air battery, the solid electrolyte is decomposed at a charge potential. Thus, there remains a need for a solid electrolyte having improved properties.

SUMMARY

Provided are a composite electrode for a lithium air battery having an improved energy density and a method of preparing the composite electrode.

Provided is a lithium air battery having improved capacity and life characteristics and includes the composite electrode.

Additional aspects will be set forth in part in the description which follows and, in part, will be apparent from the description, or may be learned by practice of the presented embodiments.

According to an aspect, a composite electrode for a lithium air battery includes:
i) a polymerization product of a first heteroatom-containing ionic liquid, or
ii) a mixture of a second heteroatom-containing ionic liquid and a polymer ionic liquid represented by Formula 1:

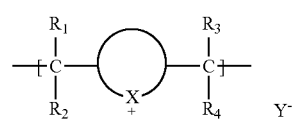
Formula 1 wherein, in Formula 1,

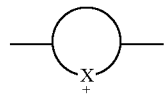

denotes an unsubstituted or substituted 3 to 31 membered ring including 2 to 30 carbon atoms and at least one heteroatom selected from nitrogen, oxygen, phosphorus, and sulfur;

X is selected from —N($R_2$')($R_3$'), —N($R_2$'), —P($R_2$'), and —P($R_2$')($R_3$');

$R_1$ to $R_4$, $R_2$', and $R_3$' are, each independently, selected from a hydrogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, and an unsubstituted or substituted C3-C30 heterocycloalkyl group; and $Y^-$ is an anion.

According to another aspect, a method of preparing a composite electrode for a lithium air battery includes coating and drying a composition for forming a composite electrode including i) a first heteroatom-containing ionic liquid or ii) a mixture of a second heteroatom-containing ionic liquid and a polymer ionic liquid represented by Formula 1 to form the composite electrode.

According to another aspect, a lithium air battery includes the composite electrode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
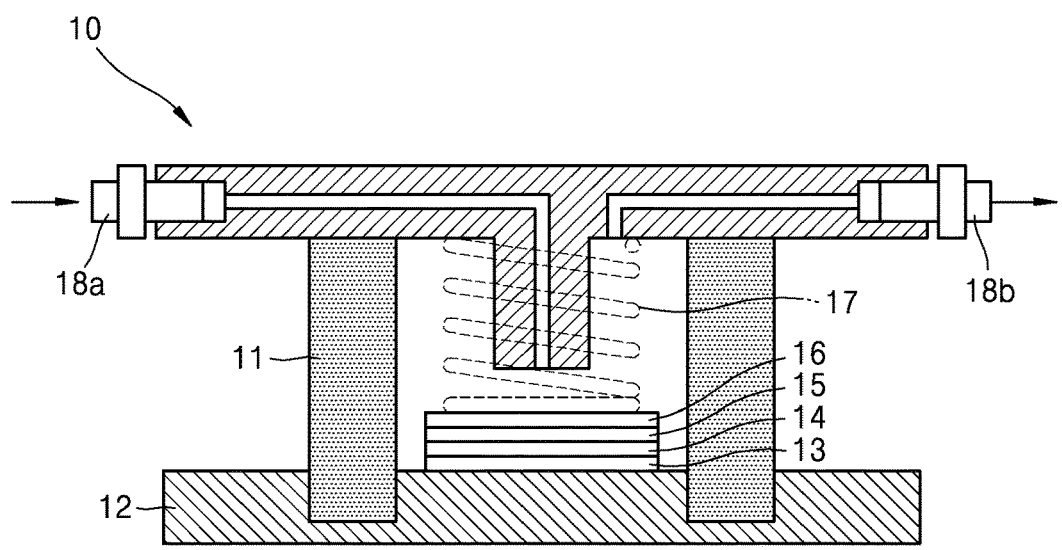
FIG. 1 is a schematic view of an embodiment of a structure of a lithium air battery.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. The term "or" means "and/or." Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a composite electrode for a lithium air battery, a method of preparing the composite electrode, and a lithium air battery including the composite electrode according to one or more embodiments will be described in further detail.

According to an embodiment, provided is a composite electrode for a lithium air battery, wherein the composite electrode includes i) a polymerization product of a first heteroatom-containing ionic liquid, or ii) a mixture of a second heteroatom-containing ionic liquid and a polymer ionic liquid represented by Formula 1.

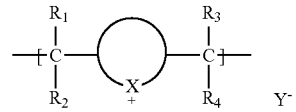

Formula 1

In Formula 1,

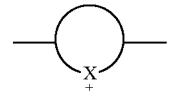

denotes an unsubstituted or substituted 3 to 31 membered ring including 2 to 30 carbon atoms and at least one heteroatom selected from nitrogen, oxygen, phosphorus, and sulfur;

X is selected from —N($R_2'$)($R_3'$), —N($R_2'$), —P($R_2'$), and —P($R_2'$)($R_3'$);

wherein $R_1$ to $R_4$, $R_2'$, and $R_3'$ are, each independently, selected from a hydrogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, and an unsubstituted or substituted C3-C30 heterocycloalkyl group; and $Y^-$ is an anion.

The group

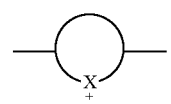

may denote an unsubstituted or substituted C3-C30 heteroaryl ring.

The polymer electrolyte contained in the composite electrode may be in a solid phase or a gel phase.

As used herein with reference to the polymerization product, the term "polymerization" includes all reactions possible between polymerizable substituents of the first heteroatom-containing ionic liquid. In addition to a copolymerization reaction, such reactions may include a cross linking reaction and a graft reaction.

The composite electrode for a lithium air battery may include the chemically and electrochemically stable polymerized first heteroatom-containing ionic liquid or the polymeric ionic liquid represented by Formula 1. By using the above polymerized ionic liquids, high energy density and good stability of the composite electrode may be provided. The composite electrode may contain less of the electrolyte when compared to an electrode containing a liquid electrolyte. In addition, a problem of deterioration of life characteristics of a lithium air battery as a result of a reaction of the electrolyte with a lithium peroxide (e.g., $Li_2O_2$), which is a discharge product of a lithium air battery, may be prevented as reactivity of the electrolyte towards lithium peroxide ($Li_2O_2$) is reduced. Therefore, when the composite electrode, which is chemically and electrochemically stable with respect to the discharge product, is used, a lithium air battery having improved life and capacity characteristics may be prepared.

The composite electrode may be, for example, a composite positive electrode.

The first heteroatom-containing ionic liquid is a polymerizable ionic liquid, which may be represented by Formula 2 or Formula 2a.

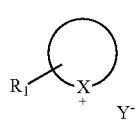

Formula 2

In Formula 2,

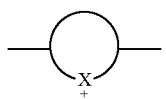

denotes an unsubstituted or substituted 3 to 31 membered ring including 2 to 30 carbon atoms and at least one heteroatom selected from nitrogen, oxygen, phosphorus, and sulfur. The ring may, for example, include 4 to 30 carbon atoms or 6 to 30 carbon atoms.

Also, in Formula 2,

X is selected from $N(R_2')(R_3')$, $-N(R_2')$, $-P(R_2')$, and $-P(R_2')(R_3')$, wherein $R_2'$ and $R_3'$ are each independently selected from a hydrogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, and an unsubstituted or substituted C3-C30 heterocycloalkyl group, $R_1$ denotes a polymerizable substituent, and $Y^-$ is an anion

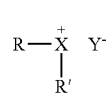

Formula 2a

In Formula 2a,

X and Y are the same as defined in Formula 2, and at least one of R and R' comprises a polymerizable substituent or an organic group including a polymerizable substituent, the organic group is selected from the group consisting of an unsubstituted or substituted C1-C30 alkyl group, an unsubstituted or substituted C2-C30 alkenyl group, an unsubstituted or substituted C2-C30 alkynyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, and an unsubstituted or substituted C3-C30 heterocycloalkyl group, the unselected rest of R and R' is an unsubstituted or substituted C1-C30 alkyl group, an unsubstituted or substituted C2-C30 alkenyl group, an unsubstituted or substituted C2-C30 alkynyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, or an unsubstituted or substituted C3-C30 heterocycloalkyl group, In Formula 2a, the polymerizable substituent has a reactive unsaturated bond. For example, the polymerizable substituent is a vinyl group or an allyl group.

The organic group having the polymerizable substituent is a hydrocarbyl group has a reactive unsaturated bond.

$R_1$, R', and R" are polymerizable substituents, which may contain a reactive unsaturated bond, for example, a vinyl group or an allyl group.

In Formula 2,

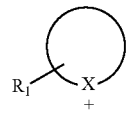

may be a cation represented by Formula 3.

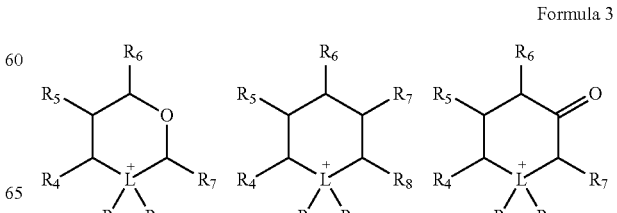

Formula 3

-continued

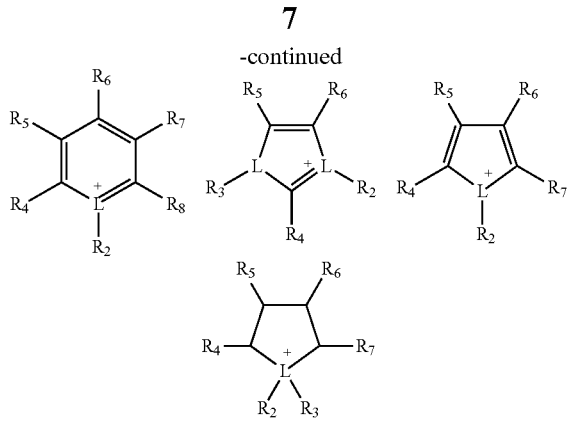

In Formula 3,

L is N or P, at least one of $R_2$ to $R_8$ is a C2-C10 alkenyl group, the unselected rest of $R_2$ to $R_8$ are each independently selected from a hydrogen atom, an unsubstituted or substituted C1-C30 alkyl group, an unsubstituted or substituted C2-C30 alkenyl group, an unsubstituted or substituted C2-C30 alkynyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, and an unsubstituted or substituted C3-C30 heterocycloalkyl group, provided that at least one of $R_2$ to $R_8$ is a C2-C10 alkenyl group.

In Formula 2,

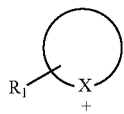

may be a cation represented by Formula 3a.

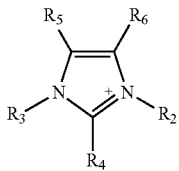

In Formula 3a, at least one of $R_2$ to $R_6$ is a C2-C10 alkenyl group, and the unselected rest of $R_2$ to $R_6$ are each independently selected from a hydrogen atom, an unsubstituted or substituted C1-C30 alkyl group, an unsubstituted or substituted C2-C30 alkenyl group, an unsubstituted or substituted C2-C30 alkynyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, and an unsubstituted or substituted C3-C30 heterocycloalkyl group.

Each of $R_4$ to $R_6$ may be a hydrogen atom, one of $R_2$ and $R_3$ may be a C1-C10 alkyl group or a C2-C10 alkenyl group, and the other one of $R_2$ and $R_3$ may be a C2-C10 alkenyl group.

In Formula 1, $Y^-$ may be at least one selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $CF_3SO_3^-$, $(C_2F_5SO_2)_2N^-$, $(C_2F_5SO_2)(CF_3SO_2)N^-$, and $(CF_3SO_2)_2N^-$, for example, at least one selected from $BF_4^-$, $Cl^-$, $Br^-$, $I^-$, $PF_6^-$, $ClO_4^-$, $CF_3SO_3^-$, $(CF_3SO_2)_2N^-$, $CF_3CO_2^-$, and $(C_2F_5SO_2)_2N^-$.

The first heteroatom-containing ionic liquid may be a compound represented by Formula 4.

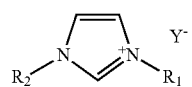

Formula 4

In Formula 4, $R_1$ is selected from a methyl group, a butyl group, and an aryl group;

$R_2$ is selected from a vinyl group and an allyl group; and $Y^-$ is at least one selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $CF_3SO_3^-$, $(C_2F_5SO_2)_2N^-$, $(C_2F_5SO_2)(CF_3SO_2)N^-$, and $(CF_3SO_2)_2N^-$.

Examples of the compound represented by Formula 4 may be 1-allyl-3-methylimidazolium tetrafluoroborate, 1-allyl-3-methylimidazolium bis(trifluoromethanesulfonyl)imide, 1-allyl-3-butylimidazolium tetrafluoroborate, and 1-allyl-3-butylimidazolium bis(trifluoromethanesulfonyl)imide.

The ionic liquid represented by Formula 1a may be a compound represented by Formula 2b or Formula 2c.

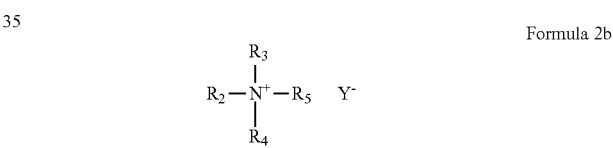

Formula 2b

In Formula 2b, $R_2$ to $R_5$ are each independently selected from a hydrogen atom, an unsubstituted or substituted C1-C30 alkyl group, an unsubstituted or substituted C2-C30 alkenyl group, an unsubstituted or substituted C2-C30 alkynyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, and an unsubstituted or substituted C3-C30 heterocycloalkyl group, provided that at least one of $R_2$ to $R_5$ is a C2-C10 alkenyl group, and $Y^-$ is an anion.

Formula 2c

In Formula 2c, the descriptions of $R_2$ to $R_5$ and Y are the same as the description of these groups in Formula 2b.

In Formula 1,

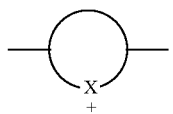

denotes a cation represented by Formula 3c.

Formula 3c

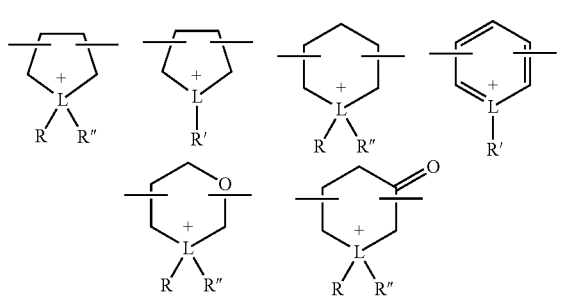

In Formula 3c,

L denotes N or P, and

R' and R" are each independently selected from a hydrogen atom, a C1-C30 alkyl group (e.g., a C1-C10 or C3-C5 alkyl group), a C1-C30 alkoxy group (e.g., a C1-C10 or C3-C5 alkoxy group), a C6-C30 aryl group (e.g., a C6-C10 aryl group), a C6-C30 aryloxy group (e.g., a C6-C10 aryloxy group), a C3-C30 heteroaryl group (e.g., a C4-C9 heteroaryl group), a C3-C30 heteroaryloxy group (e.g., a C4-C9 heteroaryloxy group), a C4-C30 cycloalkyl group (e.g., a C5-C10 cycloalkyl group), and a C3-C30 heterocycloalkyl group (e.g., a C4-C9 heterocycloalkyl group).

The polymer represented by Formula 1 may be, for example, a polymer represented by Formula 1a.

Formula 1a

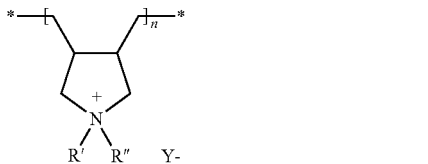

In Formula 1a,

R' and R" are each independently selected from a hydrogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, and an unsubstituted or substituted C3-C30 heterocycloalkyl group, $Y^-$ is at least one selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $CF_3SO_3^-$, $(C_2F_5SO_2)_2N^-$, $(C_2F_5SO_2)(CF_3SO_2)N^-$, and $(CF_3SO_2)_2N^-$, for example, one selected from $BF_4^-$, $Cl^-$, $Br^-$, $I^-$, $SO_4^-$, $PF_6^-$, $ClO_4^-$, $CF_3SO_3^-$, $(CF_3SO_2)_2N^-$, $CF_3CO_2^-$, and $(C_2F_5SO_2)_2N^-$, and n is an integer of 500 to 2,800.

A weight average molecular weight of the polymer represented by Formula 1 is about 100,000 or greater, for example, from about 100,000 to about 500,000. The weight average molecular weight of the polymer is measured by using a gel permeation chromatography ("GPC"). When a weight average molecular weight of the polymer is within the above ranges, capacity characteristics of the composite positive electrode are excellent.

Also, a weight average molecular weight of a polymerization product of the first heteroatom-containing ionic liquid may be in the same range as the weight average molecular weight of the polymer represented by Formula 1.

The polymer represented by Formula 1a may be a polymer represented by Formula 1b.

Formula 1b

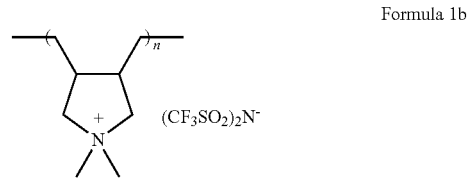

In Formula 1b, n is an integer of 500 to 2,800.

The second heteroatom-containing ionic liquid may be one selected from compounds represented by Formula 3.

The second heteroatom-containing ionic liquid may be, for example, a compound represented by Formula 3a.

Formula 3a

In Formula 3a,

R' and R" are each independently selected from a hydrogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, and an unsubstituted or substituted C3-C30 heterocycloalkyl group, and $Y^-$ is at least one selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $CF_3SO_3^-$, $(C_2F_5SO_2)_2N^-$, $(C_2F_5SO_2)(CF_3SO_2)N^-$, and $(CF_3SO_2)_2N^-$, for example, at least one selected from $BF_4^-$, $Cl^-$, $Br^-$, $I^-$, $SO_4^-$, $PF_6^-$, $ClO_4^-$, $CF_3SO_3^-$, $(CF_3SO_2)_2N^-$, $CF_3CO_2^-$, and $(C_2F_5SO_2)_2N^-$.

The second heteroatom-containing ionic liquid may be a compound represented by Formula 3b.

Formula 3b

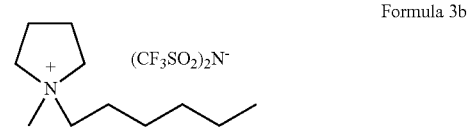

In the composite electrode, a content of the polymer electrolyte may be from about 20 parts to about 90 parts by weight, for example, from about 20 parts to about 85 parts by weight, and for example, from about 30 parts to about 85 parts by weight, based on 100 parts by weight of the composite electrode.

When the polymer electrolyte includes a mixture of the second heteroatom-containing ionic liquid and the polymer ionic liquid represented by Formula 1, a content of the second heteroatom-containing ionic liquid may be from about 10 parts to about 90 parts by weight, for example, from about 40 parts to about 70 parts by weight, based on 100 parts by weight of the total weight of the mixture of the second heteroatom-containing ionic liquid and the polymer ionic liquid represented by Formula 1. When a content of the second heteroatom-containing ionic liquid is within the above ranges, reactivity of a lithium air battery with respect to a discharge product may be suppressed without decrease of an energy density of the composite positive electrode.

The composite electrode according to an embodiment further includes a lithium salt.

A content of the lithium salt may be in a range of about 0.01 molar ("M") to about 5 M, for example, from about 0.2 M to about 2 M in the composition for forming a polymer electrode. Also, a content of the lithium salt in the furnished composite electrode is from about 20 parts to about 50 parts by weight, based on 100 parts by weight of the polymerization product of the first heteroatom-containing ionic liquid or the total weight of the mixture of the second heteroatom-containing ionic liquid and the polymer ionic liquid of Formula 1.

When a content of the lithium salt is within the above range, a lithium air battery having improved capacity and life characteristics may be prepared.

The lithium salt may be dissolved in a solvent and may serve as a source of lithium ions in the battery. The lithium salt may be one or more selected from $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiF, LiBr, LiCl, LiOH, LiI and lithium bis(oxalato)borate (LiBOB, $LiB(C_2O_4)_2$).

A metal salt may be further included in addition to the lithium salt. Examples of the metal salt may include $AlCl_3$, $MgCl_2$, NaCl, KCl, NaBr, KBr, and $CaCl_2$.

In the case when the composite electrode according to an embodiment includes the polymer electrolyte containing the mixture of the second heteroatom-containing ionic liquid and the polymer ionic liquid represented by Formula 1, when an anion of the second heteroatom-containing ionic liquid and an anion of the polymer ionic liquid of Formula 1 are identical, miscibility of the two liquids is excellent, and thus overall characteristics (such as, energy density) of a composite electrode may improve.

For example, when the compound represented by Formula 3b is used as the second heteroatom-containing ionic liquid, and when the polymer ionic liquid of Formula 1b is used as the polymer ionic liquid of Formula 1, the anions of the ionic liquids (TFSI) are the same. Accordingly, miscibility between the second heteroatom-containing ionic liquid and the polymer ionic liquid of Formula 1 may be excellent.

The composite electrode may be, for example, a composite positive electrode. The composite positive electrode may further include an electrode catalyst. Here, the electrode catalyst may be a catalyst used for oxidation/reduction of oxygen. Examples of the catalyst may include a noble metal catalyst, such as platinum, gold, silver, palladium, ruthenium, rhodium, or osmium, an oxide catalyst, such as a manganese oxide, an iron oxide, a cobalt oxide, or a nickel oxide, and an organometallic catalyst, such as a cobalt phthalocyanine. However, the examples of a catalyst are not limited thereto, and any catalyst that is capable of oxidizing/reducing oxygen in the art may be used.

The catalyst may be disposed on a support. The support may be an oxide, a zeolite, a clay mineral, or carbon. The oxide may include at least one oxide of alumina, silica, zirconium oxide, and titanium dioxide. The oxide may further include at least one metal selected from Ce, Pr, Sm, Eu, Tb, Tm, Yb, Sb, Bi, V, Cr, Mn, Fe, Co, Ni, Cu, Nb, Mo, and W. Examples of the carbon support may include a carbon black, such as Ketjen black, acetylene black, channel black, or lamp black; graphites, such as natural graphite, artificial graphite, or expanded graphite; active carbons; or carbon fibers. However, the examples of a support are not limited thereto, and any support available in the art may be used.

Hereinafter, a method of preparing a composite electrode for a lithium air battery according to an embodiment will be described.

First, a composition for forming a composite electrode including i) a first heteroatom-containing ionic liquid or ii) a mixture of a second heteroatom-containing ionic liquid and a polymer represented by Formula 1 is coated and dried on a substrate to form a composite electrode.

The first heteroatom-containing ionic liquid or the mixture of a second heteroatom-containing ionic liquid and a polymer represented by Formula 1 are included in the composition for forming a polymer electrolyte. The composition may further include a lithium salt. Here, a content of the lithium salt in the composition for forming a polymer electrolyte may be from about 0.01 M to about 5 M, for example, from about 0.2 M to about 2 M.

The composition for forming a composite electrode may further include an electrode catalyst.

A conducting material and/or a binder may be further included in the composition, in addition to the electrode catalyst. The conducting material and the binder will be described below.

The substrate may be a general support. The support may be a Mylar film, a polyethylene terephthalate film, and a glass substrate.

The coating may be performed by a casting method, a spraying method, a doctor blade method, a printing method, a spin-coating method, a dipping method, or a knife-coating method. In an embodiment, the coating may be performed by using a printing method, for example, a screen printing method.

The drying may be performed at a temperature in a range of from room temperature (20 to 25° C.) to about 150° C. The drying may be performed in vacuum. Here, the vacuum may be in a range of about 0.1 torr to about 1 torr.

Through the drying process, a solvent component may be removed by evaporation. Depending on a drying temperature, polymerization of the first heteroatom-containing ionic liquid may be carried out.

A drying time may vary depending on the range of the drying temperature. The drying time may be in a range of, for example, from about 1 hour to about 5 hours.

A process of irradiating the composition with light may be further included in the method, in addition to the drying process. In this embodiment, only the solvent component is removed during the drying process. When the composition is irradiated with light, polymerization of the first heteroatom-containing ionic liquid takes place. Here, the first heteroatom-containing ionic liquid has a substituent capable of photo-polymerization.

When the composition for forming a polymer electrolyte includes the first heteroatom-containing ionic liquid, the composition may include the first heteroatom-containing ionic liquid, a polymerization initiator, and an organic solvent. As described above, a lithium salt may be further added to the composition for forming a polymer electrolyte.

The light irradiation may be carried out by using UV rays to perform polymerization. According to an embodiment, the UV output may be in a range of about 0.5 kilowatts ("kW") to about 1.5 kW, and an irradiation time may be in a range of about 0.5 hour to about 3 hours. The composition may be maintained at room temperature (20° C.) for 1 hour to 5 hours before irradiating with light. As used herein, the heating process may refer to heat-treating which can be performed within a temperature range of about 50° C. to about 150° C.

The polymerization initiator may be a thermal polymerization initiator or a photo-polymerization initiator. Examples of the polymerization initiator include photo-polymerization initiators, such as 2,2'-azobisisobutyronitrile ("AIBN"), benzoyl peroxide, acetophenone, trichloroacetophenone, 2-hydroxy-2-methylpropiophenone, 2-hydroxy-2-methylisopropiophenone, 1-hydroxychlorohexyl ketone, benzoin ether, 2,2-diethoxyacetophenone, and benzyldimethyl ketal; high-temperature thermal polymerization initiators, such as cumene hydroperoxide, t-butyl hydroperoxide, dicumyl peroxide, and di-t-butyl peroxide; thermal polymerization initiators, such as lauroyl peroxide, persulfate, 2,2'-azobis(2,4-dimethylvaleronitrile), and 2,2'-azobis(4-methoxy-2,4-dimethyl valeronitrile); low-temperature thermal polymerization initiators (redox initiator), such as hydrogen peroxide-ferrous salt, persulfate.sodium metabisulfite, cumene hydroperoxide-ferrous salt, and benzoyl peroxide.dimethylaniline; peroxide.organometallic alkyl; triethylborane; and diethylzinc. The polymerization initiators may be used alone or in a mixture, and a content of the polymerization initiator may be in a range of about 0.1 part to about 1 part by weight, for example, about 0.1 part to about 0.5 part by weight, based on 100 parts by weight of the composition for forming a polymer electrolyte. When a content of the polymerization initiator is within the above ranges, a desired polymer may be obtained in a high yield without decrease in reactivity of polymerization.

Examples of the organic solvent include acrylonitrile, methyl ethyl ketone, acetonitrile, acetone, formamide, N,N-dimethyl formamide, tetrahydrofuran, methanol, ethanol, N-methyl-2-pyrrolidinone, N,N-dimethylsulfoxide, 1,3-dioxolane, sulfolane, and dimethylsulfolane. A content of the organic solvent may be in a range of about 100 parts to about 5,000 parts by weight, based on 100 parts by weight of the first heteroatom-containing ionic liquid.

According to another aspect, a lithium air battery includes the composite electrode.

The lithium air battery includes a negative electrode, an electrolyte, and a composite positive electrode using oxygen as a positive electrode active material.

The electrolyte may be an aqueous electrolyte or a non-aqueous electrolyte.

The lithium air battery may be a lithium primary battery or a lithium secondary battery. The lithium air battery is not particularly limited in shape, and the shape of the lithium air battery may be, for example, a coin-type, a button-type, a sheet-type, a laminated-type, a cylindrical-type, a flat-type, or a horn-type. The lithium air battery may be applied to a large battery for electrical vehicles.

FIG. 1 is a schematic view of a lithium air battery 10 including a composite positive electrode according to an embodiment.

The lithium air battery 10 includes an electrolyte 15, according to an embodiment, which is disposed between a composite positive electrode 16 using oxygen as an active material and a negative electrode 13. An interlayer 14 may be disposed between the negative electrode 13 and the electrolyte 15 to separate the negative electrode 13 and the electrolyte 15.

The electrolyte 15 has excellent lithium ion conductivity and a small resistance per area when combined with a negative electrode.

A lithium ion conductive solid electrolyte membrane or a separator may be further disposed between the negative electrode 13 and the interlayer 14 or between the interlayer 14 and the electrolyte 15.

The composite positive electrode 16 includes a current collector, and a pressing member 17 transferring air to the composite positive electrode 16 is disposed on the current collector. As shown in FIG. 1, a case 11 made of an insulating resin material includes the composite positive electrode 16 and the negative electrode 13. Also, air is supplied through an air inlet 18a and discharged through an air outlet 18b.

As used herein, the term "air" is not limited to air in the atmosphere but may denote pure oxygen gas or any combination of gases including oxygen.

As shown in FIG. 1, the interlayer 14 may be formed on a surface of the negative electrode 13 to serve as a protection layer that protects lithium of the negative electrode 13 from the electrolyte 15. The interlayer 14 may be formed of a polyethylene oxide ("PEO") membrane including a lithium salt ("LiTFSi") or a membrane including oxide particles as a filler in the membrane. For example, the interlayer may be formed of a silica-PEO membrane.

The electrolyte 15 may be a lithium ion conductive solid electrolyte membrane.

Examples of the lithium ion conductive solid electrolyte membrane may include a lithium ion conductive glass, lithium ion conductive crystals (ceramic or glass-ceramic) or an inorganic material containing a mixture thereof. To ensure chemical stability, the lithium ion conductive solid electrolyte membrane includes an oxide.

When the lithium ion conductive solid electrolyte membrane includes a large amount of lithium ion conductive crystals, a high ion conductivity may be obtained, and thus the amount of the lithium ion conductive crystals may be about 50 percent by weight ("wt %") or greater, for example, about 55 wt % or greater, based on the total weight of the solid electrolyte membrane.

The lithium ion conductive crystals may be crystals having a perovskite structure having lithium ion conductivity, such as $Li_3N$, LISICON and $La_{0.55}Li_{0.35}TiO_3$, $LiTi_2P_3O_{12}$ having a NASICON-type structure, or glass-ceramic precipitating crystals thereof.

The lithium ion conductive crystals may be, for example, $Li_{1+x+y}(Al, Ga)_x(Ti, Ge)_{2-x}Si_yP_{3-y}O_{12}$ (wherein, $0 \leq x \leq 1$, $0 \leq y \leq 1$, for example, $0 \leq x \leq 0.4$, $0 < y \leq 0.6$, or $0.1 \leq x \leq 0.3$, $0.1 < y \leq 0.4$). For the lithium ion conductive crystals to have a high ion conductivity, a grain boundary capable of interfering with ion conductivity needs to be absent from the lithium ion conductive crystals. For example, glass-ceramic almost does not have pores or grain boundaries capable of interfering with ion conductivity, and thus glass-ceramic has a high ion conductivity and an excellent chemical stability.

Examples of the lithium ion conductive glass-ceramic include lithium-aluminum-germanium-phosphate ("LAGP"), lithium-titanium-aluminum-phosphate ("LTAP"), and lithium-aluminum-titanium-silicon-phosphate ("LATSP").

For example, a mother glass may have a $Li_2O$—$Al_2O_3$—$TiO_2$—$SiO_2$—$P_2O_5$ composition. When the mother glass is crystallized by heat-treating, a main crystalline phase is $Li_{1+x+y}Al_xTi_{2-x}Si_yP_{3-y}O_{12}$ (0≤x≤1, 0≤y≤1), wherein, x and y may be, for example, 0≤x≤0.4 and 0<y≤0.6, or 0.1≤x≤0.3 and 0.1<y≤0.4.

Here, pores or grain boundaries interfering ion conductivity refer to an ion conductive inhibiting material having pores or grain boundaries that reduces a conductivity of the whole inorganic material including the lithium ion conductive crystals to a value of 1/10 or less to the conductivity of the lithium ion conductive crystals themselves in the inorganic material.

According to an embodiment, an electrolyte may include $Li_{1+x+y}Al_xTi_{2-x}Si_yP_{3-y}O_{12}$ (0≤x≤1, 0≤y≤1). Here, x and y may be, for example, 0≤x≤0.4 and 0<y≤0.6, or 0.1≤x≤0.3 and 0.1<y≤0.4.

According to another embodiment, the electrolyte includes $Li_{1+x+y}Al_x(Ti,Ge)_{2-x}Si_yP_{3-y}O_1$, wherein 0≤x≤2, 0≤y≤3), and the electrolyte is a solid electrolyte membrane including, for example, LTAP ($Li_{1.4}Ti_{1.6}Al_{0.4}P_3O_{12}$).

The electrolyte 15 may be a polymer solid electrolyte. The polymer solid electrolyte may be, for example, a polyethylene oxide doped with a lithium salt.

Examples of the lithium salt include $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, and $LiAlCl_4$.

According to another embodiment, the electrolyte 15 may be a liquid electrolyte including a solvent and a lithium salt.

The solvent may further include at least one selected from an aprotic solvent and water.

Examples of the aprotic solvent include a carbonate solvent, an ester solvent, an ether solvent, a ketone solvent, an amine solvent, and a phosphine solvent.

Examples of the carbonate solvent include dimethyl carbonate ("DMC"), diethyl carbonate ("DEC"), ethyl methyl carbonate ("EMC"), dipropyl carbonate ("DPC"), methyl propyl carbonate ("MPC"), ethyl propyl carbonate ("EPC"), methyl ethyl carbonate ("MEC"), ethylene carbonate ("EC"), propylene carbonate ("PC"), and butylene carbonate ("BC").

Examples of the ester solvent include methyl acetate, ethyl acetate, n-propyl acetate, dimethyl acetate, methyl propionate, ethyl propionate, γ-butyrolactone, decanolide, valerolactone, mevalonolactone, and caprolactone.

Examples of the ether solvent include dibutyl ether, tetraglyme, diglyme, dimethoxyethane, 2-methyltetrahydrofuran, and tetrahydrofuran. Examples of the ketone solvent include cyclohexanone.

Examples of the amine solvent include triethylamine and triphenylamine. Examples of the phosphine solvent include triethylphosphine. The solvent is not limited thereto, and any aprotic solvent available in the art may be used.

Also, examples of the aprotic solvent may include nitriles such as R—CN (wherein, R is a C2 to C30 linear, branched, or cyclic hydrocarbon group, which may include a double bond, an aromatic ring, or an ether bond), amides such as dimethylformamide, dioxolanes such as 1,3-dioxolane, and sulfolanes.

The aprotic solvent may be used alone or in a mixture. When the solvent is used in a mixture, the mixture ratio may be controlled in accordance with desirable battery performance as it would be apparent to one of ordinary skill in the art.

Also, the electrolyte may include an ionic liquid.

For the ionic liquid, a linear or branch substituted compound composed of a cation such as ammonium, imidazolium, or piperidinium and an anion such as $PF_6^-$, $BF_4^-$, $CF_3SO_3^-$, $(CF_3SO_2)_2N^-$, $(C_2F_5SO_2)_2N^-$, $(C_2F_5SO_2)_2N^-$, or $(CN)_2N^-$ may be used.

All or part of the electrolyte may be impregnated in a positive electrode or a negative electrode.

For a composite electrode using oxygen as a positive electrode active material, a conductive material may be used. The conductive material may be porous. Thus, any conductive positive electrode active material with pores may be used, such as a porous carbon material. Examples of the carbon material include carbon black, graphite, graphene, active carbon, and carbon fiber.

Examples of the positive electrode active material may include a metallic conductive material, such as metal fibers and metal mesh. Examples of the positive electrode active material may further include a metal powder, such as copper, silver, nickel, and aluminum. The positive electrode active material may be an organic conductive material, such as a polyphenylene derivative. The conductive materials may be used alone or in a mixture.

The composite positive electrode may include a catalyst for oxidation/reduction of oxygen. Examples of the catalyst may include a noble metal catalyst, such as platinum, gold, silver, palladium, ruthenium, rhodium, or osmium, an oxide catalyst, such as a manganese oxide, an iron oxide, a cobalt oxide, or a nickel oxide, and an organometallic catalyst, such as a cobalt phthalocyanine. However, the examples of a catalyst are not limited thereto, and any catalyst that is capable of oxidizing/reducing oxygen in the art may be used.

Also, the catalyst may be disposed on a support. The support may be an oxide, a zeolite, a clay mineral, or carbon. The oxide may include at least one oxide of alumina, silica, zirconium oxide, and titanium dioxide. The oxide may include at least one metal selected from Ce, Pr, Sm, Eu, Tb, Tm, Yb, Sb, Bi, V, Cr, Mn, Fe, Co, Ni, Cu, Nb, Mo, and W. Examples of the carbon may be carbon blacks, such as Ketjen black, acetylene black, channel black, or lamp black; graphites, such as natural graphite, artificial graphite, or expanded graphite; active carbons; or carbon fibers. However, the examples of support are not limited thereto, and any support available in the art may be used.

The composite positive electrode may additionally include a binder. The binder may include a thermoplastic polymer or a thermosetting polymer. Examples of the binder may include polyethylene, polypropylene, polytetrafluoroethylene ("PTFE"), polyvinylidene fluoride ("PVDF"), styrene-butadiene rubber, a tetrafluoroethylene-perfluoroalkylvinylether copolymer ("PFA"), a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorofluoroethylene copolymer, a vinylidene fluoride-hexafluoropropylene-tetrafluoroethylene copolymer, a vinylidene fluoride-perfluoromethylvinylether-tetrafluoroethylene copolymer, or an ethylene-acrylic acid copolymer. The binder may be used alone or in a mixture, and is not limited to the above examples—any binder available in the art may be used.

The composite positive electrode may be mixed with, for example, the oxygen oxidation/reduction catalyst, the conductive material, and the binder. An appropriate solvent may be added thereto to prepare a positive electrode slurry. The slurry may be coated and dried on a surface of a current collector. Optionally, the slurry may be press-molded on the current collector in order to improve an electrode density. The product may be further irradiated with light after the coating and drying process.

The positive electrode may, optionally, include a lithium peroxide. The oxygen oxidation/reduction catalyst may be, optionally, omitted.

The current collector may have a porous structure of a net-shape or a mesh-shape for rapid diffusion of oxygen. Examples of the current collector may include a porous metal plate, such as stainless steel, nickel, and aluminum. However, the examples of the current collector are not limited thereto, and any current collector available in the art may be used. The current collector may be covered with an anti-oxidant metal or alloy cover to prevent oxidation.

In the lithium air battery, a negative electrode including lithium may be an electrolyte containing a Li metal, a Li alloy, or a material capable of intercalating or deintercalating Li. However, the examples of a negative electrode are not limited thereto, and any negative electrode capable of intercalating or deintercalating Li available in the art may be used. The negative electrode determines a capacity of the lithium air battery.

The negative electrode may be, for example, a lithium metal thin film. Examples of the Li alloy may include a Li-alloy with aluminum, tin, magnesium, indium, calcium, titanium, or vanadium.

A separator may be disposed between the positive electrode and the negative electrode. The separator may have any appropriate composition durable for the use of the lithium air battery in a particular environment. For example, the separator may be formed of a polymer non-woven fabric, such as a polypropylene non-woven fabric or a polyphenylene sulfide non-woven fabric, a porous olefin-containing resin film, for example, including polyethylene or polypropylene, or a combination of at least two of these materials.

Hereinafter the definitions of substituents used in the chemical formulas are provided.

The term "alkyl" as used herein in a chemical formula refers to a fully saturated branched or unbranched (or straight chain or linear) hydrocarbon group.

Examples of the "alkyl" include methyl, ethyl, n-propyl, isopropyl, n-butyl, isobutyl, sec-butyl, n-pentyl, isopentyl, neopentyl, iso-amyl, n-hexyl, 3-methylhexyl, 2,2-dimethylpentyl, 2,3-dimethyl pentyl, and n-heptyl. At least one hydrogen atom in the "alkyl" may be substituted with a halogen atom, a C1-C20 alkyl group (e.g.: $CF_3$, $CHF_2$, $CH_2F$, or $CCl_3$) substituted with a halogen atom, a C1-C20 alkoxy group, a C2-C20 alkoxyalkyl group, a hydroxyl group, a nitro group, a cyano group, an amino group, an amidino group, a hydrazine group, a hydrazone group, a carboxylic acid or a salt thereof, a sulfonyl group, a sulfamoyl group, a sulfonic acid or a salt thereof, a phosphoric acid or a salt thereof, or a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxy group, a C6-C20 heteroaryloxyalkyl group, or a C6-C20 heteroarylalkyl group.

The term "halogen atom" as used herein in a chemical formula includes fluorine, bromine, chlorine, and iodine.

The term "a C1-C20 alkyl group substituted with a halogen atom" refers to a C1-C20 alkyl group that is substituted with at least one halo group. Examples of the "C1-C20 alkyl group substituted with a halogen atom" include a C1-C20 monohaloalkyl or C1-C20 polyhaloalkyl (including C1-C20 dihaloalkyl or C1-C20 perhaloalkyl). The C1-C20 monohaloalkyl includes one iodine, bromine, chlorine, or fluorine in the alkyl group, and C1-C20 dihaloalkyl or C1-C20 polyhaloalkyl denotes an alkyl group having at least two halogen atoms that are identical to or different from each other.

The term "alkoxy" as used herein in a chemical formula refers to alkyl-O—, wherein the alkyl group is as described above. Examples of the alkoxy include methoxy, ethoxy, propoxy, butoxy, tert-butoxy, pentyloxy, hexyloxy, cyclopropoxy, and cyclohexyloxy. In the alkoxy group, at least one hydrogen atom may be substituted with the same substituent groups as described above in connection with the alkyl group.

The term "alkoxyalkyl" as used herein in a chemical formula refers to the case when an alkyl group is substituted with the alkoxy group described above. At least one hydrogen atom of the alkoxyalkyl may be substituted with the same substituent groups as described above in connection with the alkyl group. The term "alkoxyalkyl" includes an alkoxyalkyl moiety.

The term "alkenyl" as used herein in a chemical formula refers to a branched or non-branched hydrocarbon having at least one carbon-carbon double bond. Examples of the alkenyl group include vinyl, allyl, butenyl, isopropenyl, and isobutenyl, and at least one hydrogen atom of the alkenyl group may be substituted with the same substituent groups as described above in connection with the alkyl group.

The term "alkynyl" as used herein in a chemical formula refers to a branched or non-branched hydrocarbon having at least one carbon-carbon triple bond. Examples of the alkynyl group include ethynyl, butynyl, isobutynyl, and isopropynyl.

At least one hydrogen atom of the alkynyl group may be substituted with the same substituent groups as described above in connection with the alkyl group.

The term "aryl" as used herein in a chemical formula refers to an aromatic hydrocarbon that may be used alone or in a combination and includes at least one ring.

The term "aryl" includes a group, wherein the aromatic rings are fused with one or more cycloalkyl rings. Examples of the aryl may be phenyl, naphthyl, and tetrahydronaphthyl. Also, at least one hydrogen atom in the aryl group may be substituted with the same substituent groups as described above in connection with the alkyl group.

The term "arylalkyl" as used herein in a chemical formula refers to an alkyl group substituted with an aryl group. Examples of the arylalkyl include benzyl and phenyl-$CH_2CH_2$—.

The term "aryloxy" as used herein in a chemical formula refers to O-aryl. Examples of the aryloxy group include phenoxy. At least one hydrogen atom in the aryl group may be substituted with the same substituent groups as described above in connection with the alkyl group.

The term "heteroaryl" as used herein in a chemical formula refers to a monocyclic or bicyclic organic compound including at least one heteroatom selected from N, O, P, and S, and the remaining ring atoms are C. For example, the heteroaryl group may include 1 to 5 heteroatoms and may include 5 to 10 ring members, wherein S or N may be oxidized to various oxidation states.

At least one hydrogen atom in the heteroaryl group may be substituted with the same substituent groups as described above in connection with the alkyl group.

The term "heteroarylalkyl" as used herein in a chemical formula refers to an alkyl group substituted with heteroaryl.

The term "heteroaryloxy" as used herein in a chemical formula refers to a O-heteroaryl moiety. At least one hydrogen atom in the heteroaryloxy group may be substituted with the same substituent groups as described above in connection with the alkyl group.

The term "heteroaryloxyalkyl" as used herein in a chemical formula denotes an alkyl group substituted with heteroaryloxy. At least one hydrogen atom in the heteroaryloxyalkyl group may be substituted with the same substituent groups as described above in connection with the alkyl group.

The term "cycloalkyl" or "carbon ring" as used herein in a chemical formula refers to a saturated or partially unsaturated non-aromatic monocyclic, bicyclic, or tricyclic hydrocarbon group.

Examples of the monocyclic hydrocarbon group include cyclopentyl, cyclopentenyl, cyclohexyl, and cyclohexenyl. Examples of the bicyclic hydrocarbon group include bornyl, decahydronaphthyl, bicyclo[2.1.1]hexyl, bicyclo[2.2.1]heptyl, bicyclo[2.2.1]heptenyl, and bicyclo[2.2.2]octyl. Examples of the tricyclic hydrocarbon include adamantyl.

At least one hydrogen atom in the "carbon ring" may be substituted with the same substituent groups as described above in connection with the alkyl group.

The term "a hetero-ring" group, or a "heterocycloalkyl" group as used herein in a chemical formula refers to a ring group composed of 5 to 10 atoms containing a heteroatom, such as nitrogen, sulfur, phosphorus, or oxygen. In particular, an example of the hetero-ring group is pyridyl. At least one hydrogen atom in the "hetero-ring group" or the "heterocycloalkyl group" may be substituted with the same substituent groups as described above in connection with the alkyl group.

The term "heterocyclicoxy" or "heterocycloalkyloxy" as used herein in a chemical formula denotes a O-hetero-ring or a O-heterocycloalkyl group. At least one hydrogen atom in the "heterocyclicoxy" group or the "heterocycloalkyloxy" group may be substituted with the same substituent groups as described above in connection with the alkyl group.

The term "sulfonyl" as used herein in a chemical formula denotes R"—$SO_2$—, wherein, R" is a hydrogen atom, alkyl, aryl, heteroaryl, aryl-alkyl, heteroaryl-alkyl, alkoxy, aryloxy, cycloalkyl group, or a hetero-ring group.

The term "sulfamoyl" as used herein in a chemical formula denotes $H_2NS(O_2)$—, alkyl-$NHS(O_2)$—, (alkyl)$_2NS(O_2)$-aryl-$NHS(O_2)$—, alkyl-(aryl)-$NS(O_2)$—, (aryl)$_2NS(O)_2$, heteroaryl-$NHS(O_2)$—, (aryl-alkyl)-$NHS(O_2)$—, or (heteroaryl-alkyl)-$NHS(O_2)$—.

At least one hydrogen atom in the "sulfamoyl group" may be substituted with the same substituent groups as described above in connection with the alkyl group.

The term "amino group" as used herein in a chemical formula includes a nitrogen atom that is covalently bonded to at least one carbon atom or heteroatom. The amino group includes —$NH_2$ and substituted moieties. Other examples of the amino group include an alkylamino group, in which a nitrogen atom is attached to at least one additional alkyl group, and an aryl amino group or a diarylamino group, in which a nitrogen atom is attached to at least one or two independently selected aryl groups.

Hereinafter, the examples will be described in detail. However, the examples are given for illustrative purposes only and are not intended to limit the scope of the present disclosure.

EXAMPLES

Preparation Example 1: Preparation of Polymer Electrolyte

Lithium bis(trifluoromethanesulfonyl)imide ("LiTFSI") was dissolved in 1-allyl-3-methylimidazolium tetrafluoroborate, i.e., a polymerizable ion liquid, to have a concentration of 1 M to prepare a solution A.

0.1 gram (g) of AIBN, i.e., a polymerization initiator, was dissolved in 5 milliliters (mL) of N-methylpyrrolidone ("NMP"), and the solution was added to the solution A to prepare a composition for forming a polymer electrolyte. A content of AIBN in the composition for forming a polymer electrolyte was about 1 wt %, based on the total weight of the composition for forming a polymer electrolyte.

Some of the composition for forming a polymer electrolyte was poured into a polytetrafluoroethylene dish, dried at room temperature (20° C.), and then dried all night in a vacuum oven at a temperature of 80° C. to obtain a polymer electrolyte. It was confirmed that the polymer electrolyte thus obtained had a gel-phase.

Example 1: Preparation of Composite Electrode/Polymer Electrolyte Structure

Lithium bis(trifluoromethanesulfonyl)imide ("LiTFSI") was dissolved in 1-allyl-3-methylimidazolium tetrafluoroborate, i.e., a polymerizable ion liquid, to have a concentration of 1 M to prepare a solution A.

0.1 g of AIBN, i.e., a polymerization initiator, was dissolved in 5 mL of N-methylpyrrolidone ("NMP"), and the solution was added to the solution A to prepare a composition for forming a polymer electrolyte. A content of AIBN in the composition for forming a polymer electrolyte was about 1 weight percent (wt %), based on the total weight of the composition for forming a polymer electrolyte.

Pt/C (Tanaka TKK10V30E, Pt loading 28.8 wt %) and the composition for forming a polymer electrolyte were mixed in a mortar to prepare an electrode slurry. Here, a weight ratio of Pt/C and solid content of the composition for forming a polymer electrolyte was 1:1.

An inorganic lithium ion conductor, i.e., a lithium ion conducting glass ceramic (LiCGC™, Ohara, thickness: about 250 micrometers (μm)) was coated with the electrode slurry, dried at room temperature (20° C.), and then vacuum dried at a temperature of 120° C. for 2 hours to obtain a composite positive electrode/electrolyte structure having a structure of a composite electrode formed on a top of an electrolyte ("LTAP").

In the composite positive electrode prepared in Example 1, a content of the polymerization product of 1-allyl-3-methylimidazolium tetrafluoroborate was about 37 parts by weight, based on 100 parts by weight of the composite electrode, and a content of LiTFSI, i.e., a lithium salt, was 30 parts by weight, based on 100 parts by weight of polymerization product of 1-allyl-3-methylimidazolium tetrafluoroborate.

Example 2: Preparation of Composite Positive Electrode/Electrolyte Structure

Poly(diallyldimethylammonium) bis(trifluoromethanesulfonyl)imide ("TFSI") was obtained by performing an anion substitution described as follows.

A solution prepared by dissolving 8.52 g of lithium bis(trifluoromethanesulfonyl)imide (lithium bis(trifluoromethanesulfonyl)imide: LiTFSi) in mL of distilled water and a solution prepared by dissolving 4 g of poly(diallyldimethylammonium)chloride (#409030 Aldrich, weight average molecular weight: 500,000, 20 wt % in water) represented by Formula 1c in 100 mL of distilled water were put into a 250 mL round-bottom flask.

The reaction mixture was stirred at room temperature for 5 minutes, during which time white crystals were formed. The obtained white crystals were filtered and dried in a vacuum oven at a temperature of 120° C. to obtain poly (diallyldimethylammonium)TFSI represented by Formula 1b. A yield of poly(diallyldimethylammonium)TFSI was about 93.5 wt %.

Formula 1b

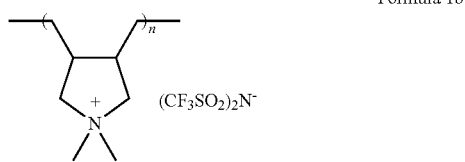

In Formula 1b, n was about 2,500.

Formula 1c

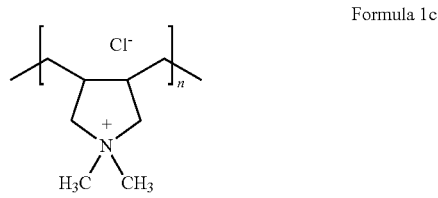

In Formula 1c, n was about 2,500.

Poly(diallyldimethylammonium)TFSI represented by Formula 1b, an ionic liquid represented by Formula 3b, and LiTFSI were dissolved in 10 g of NMP to prepare a composition for forming a polymer electrolyte. Here, a content of the lithium salt ("LiTFSI") was about 12.4 wt %, based on the total weight of the composition for forming a polymer electrolyte. Also, a mixed weight ratio of poly (diallyldimethylammonium)TFSI and the ionic liquid ("PYR16TFSi") was 60:40.

Formula 3b

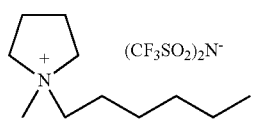

Pt/C (Tanaka, Pt loading 28.8 wt %) and the composition for forming a polymer electrolyte were mixed in a mortar so that the Pt/C and solid content of the composition for forming a polymer electrolyte had a weight ratio of 1:1 to prepare an electrode slurry.

An inorganic ion conductor, i.e., LICGC™ (Ohara, LATP sheet, 250 micrometers ("um")), was coated with the electrode slurry, dried at room temperature (20° C.), and then vacuum dried to prepare a composite positive electrode/ electrolyte structure having a structure of the composite electrode formed on a top of the electrolyte ("LTAP").

In the composite positive electrode prepared in Example 2, contents of a mixture of poly(diallyldimethylammonium) TFSI represented by Formula 1b and an ionic liquid (PYR16TFSi) represented by Formula 3b were about 40 parts by weight, based on 100 parts by weight of the composite electrode, and a content of LiTFSI, i.e., a lithium salt, was about 30 parts by weight, based on 100 parts by weight of the total weight of the mixture of poly(diallyldimethylammonium)TFSI represented by Formula 1b and the ionic liquid (PYR16TFSi) represented by Formula 3b.

Example 3: Preparation of Composite Positive Electrode/Electrolyte Structure

A composite positive electrode/electrolyte structure was prepared in the same manner as in Example 2, except that a mixing ratio of poly(diallyldimethylammonium)TFSI represented by Formula 1b and an ionic liquid (PYR16TFSi) represented by Formula 3b was changed to 50:50 by weight.

In the composite positive electrode prepared in Example 3, a content of the mixture of poly(diallyldimethylammonium)TFSI represented by Formula 1b and an ionic liquid (PYR16TFSi) represented by Formula 3b was about 40 parts by weight, based on 100 parts by weight of the composite electrode, and a content of LiTFSI, i.e., a lithium salt, was about 30 parts by weight, based on 100 parts by weight of the total weight of the mixture of poly(diallyldimethylammonium)TFSI represented by Formula 1b and the ionic liquid (PYR16TFSi) represented by Formula 3b.

Example 4: Preparation of Composite Positive Electrode/Electrolyte Structure

A composite positive electrode/electrolyte structure was prepared in the same manner as in Example 2, except that a mixing ratio of poly(diallyldimethylammonium)TFSI represented by Formula 1b and an ionic liquid (PYR16TFSi) represented by Formula 3b was changed to 45:55 by weight.

In the composite positive electrode prepared in Example 4, a content of the mixture of poly(diallyldimethylammonium)TFSI represented by Formula 1b and an ionic liquid (PYR16TFSi) represented by Formula 3b was about 40 parts by weight, based on 100 parts by weight of the composite electrode, and a content of LiTFSI, i.e., a lithium salt, was about 30 parts by weight, based on 100 parts by weight of the total weight of the mixture of poly(diallyldimethylammonium)TFSI represented by Formula 1b and the ionic liquid (PYR16TFSi) represented by Formula 3b.

Comparative Example 1: Preparation of PEO Positive Electrode/Electrolyte Structure 2 g of polyethylene oxide was dissolved in 100 ml of acetonitrile to obtain a PEO solution, and LiTFSi was added thereto to make a molar ratio of [EO]:[Li]=10:1, and dissolved by stirring the mixture to obtain a composition for forming a polymer electrolyte.

Pt/C (Tanaka TKK10V30E, Pt loading 28.8 wt %) and the composition for forming a polymer electrolyte were mixed in a mortar so that the solid materials of the Pt/C and the composition for forming a polymer electrolyte had a weight ratio of 1:1 to prepare an electrode slurry.

An inorganic ion conductor, i.e., LICGC™ (Ohara, 250 um), was coated with the electrode slurry, dried at room temperature (20° C.), and then vacuum dried at a temperature of 120° C. for 2 hours to prepare a PEO positive electrode/electrolyte structure having a structure of the composite electrode formed on a top of the electrolyte ("LTAP").

Manufacture Example 1: Manufacture of Lithium Air Battery

A brushed lithium metal (Li metal) was attached on a copper foil (Cu foil) to prepare a negative electrode 23, and 15 wt % $SiO_2$-PEO membrane was used as an interlayer 24 to prevent direct contact between LATP and Li. Here, the 15 wt % $SiO_2$-PEO membrane was prepared as follows.

Polyethylene oxide (MW 600,000), Nano $SiO_2$, and LiTFSi were added to acetonitrile and mixed for 12 hours or more. A molar ratio of LiTFSi and polyethylene oxide was about 1:18, and 15 wt % of $SiO_2$ was contained in the $SiO_2$-PEO membrane.

Figure 2:
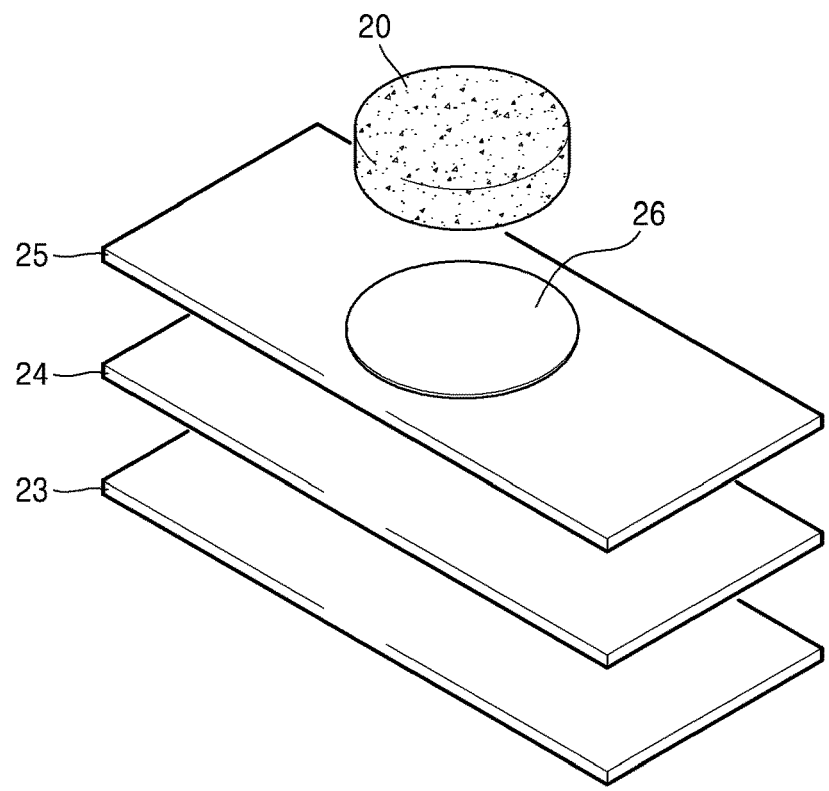
FIG. 2 illustrates a structure of a lithium air battery prepared according to Manufacture Example 1.

The lithium metal and the interlayer were stacked, and the composite positive electrode 26/electrolyte 25 structure prepared in the same manner as in Example 1 was located thereon. Thus, a cell having a structure as shown in FIG. 2 was manufactured. As shown in FIG. 2, the LTAP electrolyte 25 was disposed to contact the interlayer 24.

Carbon paper (available from SGL, 35 BA) 20 was placed on another surface of the composite electrode 26, and then a Ni mesh was disposed thereon as a current collector, thereby manufacturing a lithium air battery.

Manufacture Examples 2 to 4: Manufacture of Lithium Air Battery

Lithium air batteries were manufactured in the same manner as in Manufacture Example 1, except that the composite positive electrode/polymer electrolyte structures prepared in Examples 2 to 4 were used instead of the composite positive electrode/polymer electrolyte structure prepared in Example 1.

Comparative Manufacture Example 1: Manufacture of Lithium Air Battery

A lithium air battery was manufactured in the same manner as in Manufacture Example 1, except that the PEO positive electrode/polymer electrolyte structures prepared in Comparative Example 1 was used instead of the composite positive electrode/polymer electrolyte structure prepared in Example 1.

Evaluation Example 1: Charging/Discharging Characteristics

Figure 3:
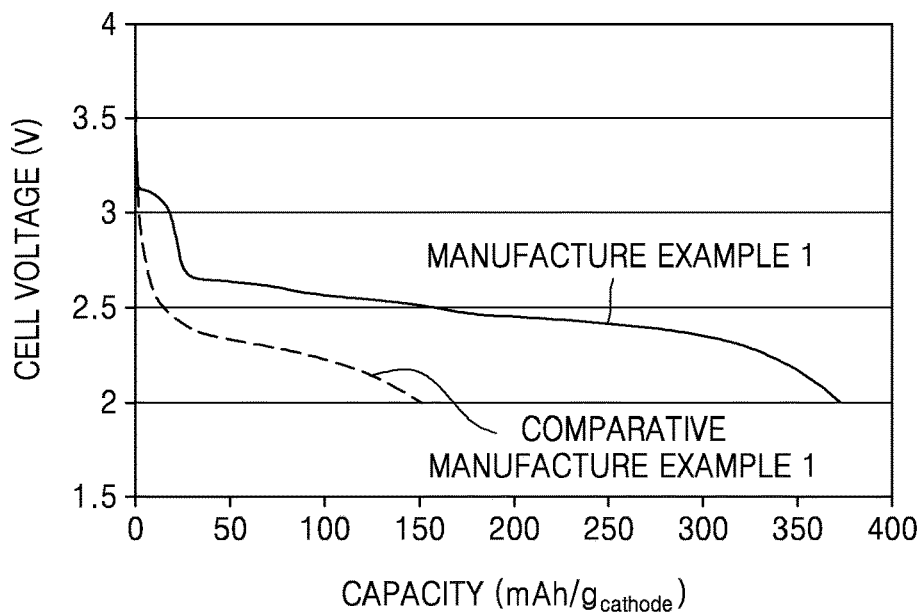
FIG. 3 is a graph of cell voltage (volts, V) versus capacity (milliampere hours per gram of a cathode, mAh/$g_{cathode}$) illustrating a cell voltage change according to a capacity of lithium air batteries prepared according to Manufacture Example 1 and Comparative Manufacture Example 1.

The lithium air batteries prepared at a temperature of 25° C. and a pressure of 1 atmosphere ("atm") in Manufacture Examples 1 to 4 and Comparative Manufacture Example 1 were placed in a chamber filled with oxygen at 1 atm, and then the lithium air batteries were discharged with a constant current of 0.2 milliamperes per square centimeter ("mA/$cm^2$") at a temperature of 60° C. until a voltage of the batteries reached 2 volts ("V") (vs. Li) and charged with the same current until a voltage of the batteries reached 4.0 V. The lithium air battery prepared in Comparative Example 1 was also discharged with a constant current of 0.2 mA/$cm^2$ at a temperature of 60° C. until voltage of the battery reached 2 V (vs. Li) and charged with the same current until a voltage of the battery reached 4.0 V. The results of discharging test are shown in FIG. 3. A discharge capacity is defined as a discharge capacity per the total weight of a composite positive electrode.

Referring to FIG. 3, it may be confirmed that discharge capacity characteristics of the lithium air battery prepared in Manufacture Example 1 improved compared to those of the lithium air battery prepared in Comparative Manufacture Example 1.

Also, as a result of evaluating a discharge capacity of the lithium air batteries prepared in Manufacture Examples 2 to 4, the lithium air batteries prepared in Manufacture Examples 2 to 4 had discharge capacity characteristics similar to those of the lithium air battery prepared in Manufacture Example 1.

Evaluation Example 2: Lithium Peroxide ("$Li_2O_2$") Reactivity Analysis

In order to evaluate reactivity of a composite positive electrode with a lithium peroxide ("$Li_2O_2$"), i.e., a discharge product of a composite positive electrode, a test was carried out as follows.

1 to 2 milligrams ("mg") of a $Li_2O_2$ powder was put into a vial, 20 mg of each of the composition for forming a polymer electrolyte prepared in Example 1 and the composition for forming a polymer electrolyte prepared in Comparative Example 1 was added into the vial. The ionic liquid was allowed to wet the $Li_2O_2$ powder to observe reactivity of each of the compositions for forming a polymer electrolyte.

After sealing the vial, the vial was put into an oven at a temperature of 60° C. and remained in the oven for 40 hours. The vial was then placed in a dry room to be cooled by maintaining a temperature at room temperature (20° C.) or lower.

A 20 wt % $H_2SO_4$ aqueous solution, a 5 wt % KI aqueous solution, and a 0.5 wt % starch aqueous solution were prepared separate from the vial.

1 mL of the 5 wt % KI aqueous solution, 1 M of the 20 wt % $H_2SO_4$ aqueous solution were added to the vial. It was confirmed that color of the solution changed to yellow, which was maintained for 5 minutes.

0.1 M $Na_2S_2O_3$ was added thereto until the yellow disappeared, and then 10 microliters (uL) of the 0.5 wt % starch aqueous solution was added until the solution was colorless.

Figure 4:
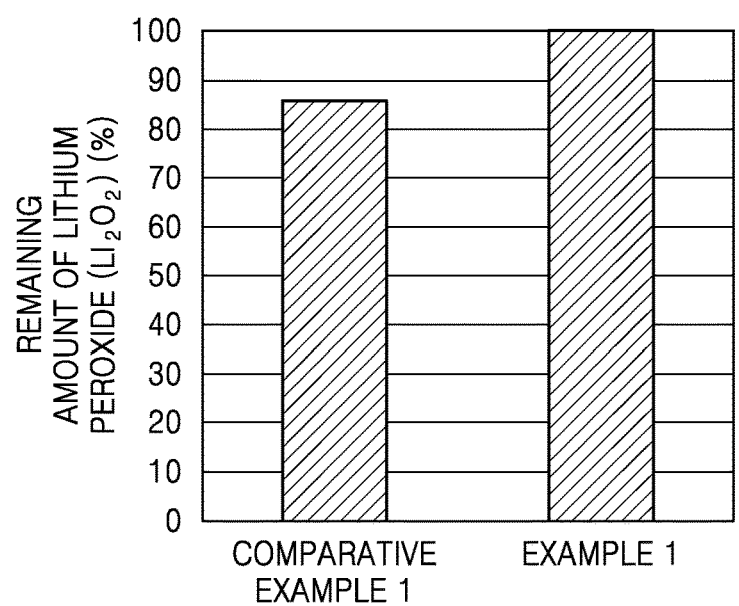
FIG. 4 is a diagram comparing remaining amounts of lithium peroxide ($Li_2O_2$) (percent, %) for the ionic liquids prepared according to Example 1 and Comparative Example 1.

An amount of remaining lithium peroxide after the test was measured by calculating amounts of $Li_2O_2$ before and after carrying out the test by using an amount of the 0.1 M $Na_2S_2O_3$ added thereto, and the results are shown in FIG. 4.

As shown in FIG. 4, when the polymer electrolyte prepared in Example 1 was used, the lithium peroxide maintained 100% the same as before the test.

In contrast, when the polymer electrolyte prepared in Comparative Example 1 was used, a remaining amount of the lithium peroxide was 85%, which was lower than before the test. In this regard, it was confirmed that, unlike in the case of the polymer electrolyte prepared in Comparative Example 1, the polymer electrolyte prepared in Example 1 had almost no reactivity with respect to the lithium peroxide, which is a discharge product. Thus, a lithium air battery including the polymer electrolyte prepared in Example 1 may have an improved life time after charging and discharging of the battery compared to a lithium air battery including the polymer electrolyte prepared in Comparative Example 1.

As described above, according to the one or more of the above embodiments, a composite electrode may include a polymer ionic liquid. Thus, when the composite electrode is included, a lithium air battery with improved life and capacity characteristics may be prepared by securing stability with respect to a discharge product as energy density improves.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present disclosure as defined by the following claims.

What is claimed is:

1. A composite electrode for a lithium air battery, the composite electrode comprising:

i) a polymerization product of a first heteroatom-containing ionic liquid represented by Formula 2 or Formula 2a:

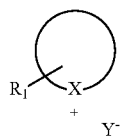

Formula 2 wherein, in Formula 2,

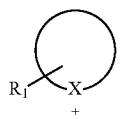

is a cation selected from cations represented by Formula 3:

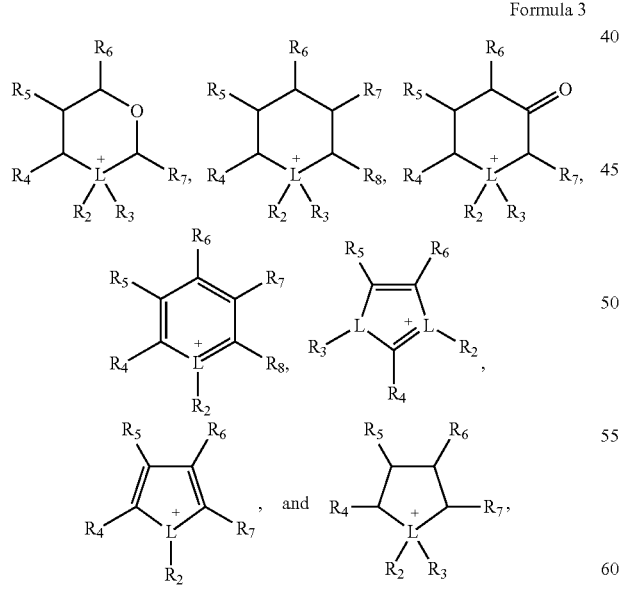

Formula 3 wherein, in Formula 3,

L is N or P;

at least two of $R_2$ to $R_8$ is a C2-C10 alkenyl group, the unselected rest of $R_2$ to $R_8$ are, each independently, selected from a hydrogen atom, an unsubstituted or substituted C1-C30 alkyl group, an unsubstituted or substituted C2-C30 alkenyl group, an unsubstituted or substituted C2-C30 alkynyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, and an unsubstituted or substituted C3-C30 heterocycloalkyl group, and $Y^-$ is an anion,

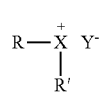

Formula 2a wherein, in Formula 2a,

X and Y are the same as defined in Formula 1, both R and R' comprise a polymerizable substituent or an organic group including a polymerizable substituent, the organic group is selected from the group consisting of an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, and an unsubstituted or substituted C3-C30 heterocycloalkyl group, or ii) a combination of a second heteroatom-containing ionic liquid and a polymeric ionic liquid represented by Formula 1:

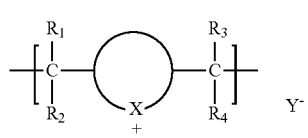

Formula 1 wherein, in Formula 1,

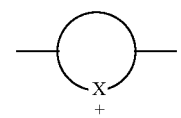

denotes an unsubstituted or substituted 3 to 31 membered ring comprising 2 to 30 carbon atoms and at least one heteroatom selected from nitrogen, oxygen, phosphorus, and sulfur;

X is selected from —N($R_2'$)($R_3'$), —N($R_2'$), —P($R_2'$), and —P($R_2'$)($R_3'$);

$R_1$ to $R_4$, $R_2'$, and $R_3'$ are, each independently, selected from a hydrogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, and an unsubstituted or substituted C3-C30 heterocycloalkyl group; and $Y^-$ is an anion.

2. The composite electrode of claim 1, wherein

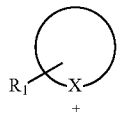

in Formula 2 is a cation represented by Formula 3a:

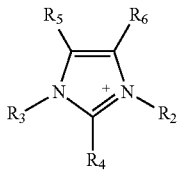

Formula 3a wherein, in Formula 3a,
at least two of $R_2$ to $R_6$ is a C2-C10 alkenyl group, and the unselected rest of $R_2$ to $R_6$ are, each independently, selected from a hydrogen atom, an unsubstituted or substituted C1-C30 alkyl group, an unsubstituted or substituted C1-C30 alkoxy group, an unsubstituted or substituted C2-C30 alkenyl group, an unsubstituted or substituted C2-C30 alkynyl group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, and an unsubstituted or substituted C3-C30 heterocycloalkyl group.

3. The composite electrode of claim 2, wherein each of $R_4$ to $R_6$ is a hydrogen atom, and each of $R_2$ and $R_3$ is a C2-C10 alkenyl group.

4. The composite electrode of claim 1, wherein, in Formula 1, $Y^-$ is at least one selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $CF_3SO_3^-$, $(C_2F_5SO_2)_2N^-$, $(C_2F_5SO_2)(CF_3SO_2)N^-$ or $(CF_3SO_2)_2N^-$.

5. The composite electrode of claim 1, wherein the first heteroatom-containing ionic liquid is a compound represented by Formula 4:

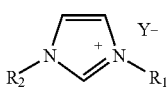

Formula 4 wherein, in Formula 4,
$R_1$ is an allyl group;
$R_2$ is selected from a vinyl group and an allyl group; and
$Y^-$ is at least one selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $CF_3SO_3^-$, $(C_2F_5SO_2)_2N^-$, $(C_2F_5SO_2^-)(CF_3SO_2)_2N^-$, and $(CF_3SO_2)_2N^-$.

6. The composite electrode of claim 1, wherein the composite electrode further comprises an electrode catalyst, wherein the electrode catalyst comprises at least one selected from platinum, gold, silver, palladium, ruthenium, rhodium, osmium, a manganese oxide, an iron oxide, a cobalt oxide, a nickel oxide, and a cobalt phthalocyanine; or wherein the electrode catalyst is a supported catalyst comprising at least one selected from platinum, gold, silver, palladium, ruthenium, rhodium, osmium, a manganese oxide, an iron oxide, a cobalt oxide, a nickel oxide, and a cobalt phthalocyanine disposed on a support.

7. The composite electrode of claim 1, wherein

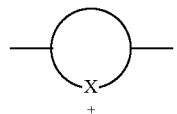

in Formula 1 is a cation selected from a cation represented by Formula 3c:

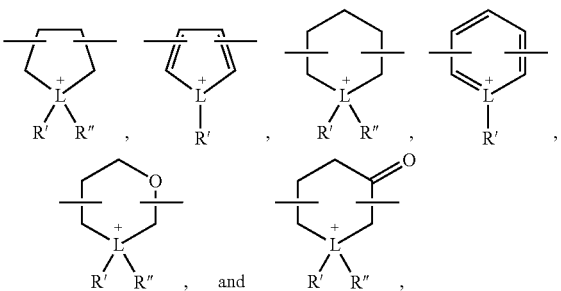

Formula 3c wherein, in Formula 3c,
L is N or P; and
R' and R" are, each independently, selected from a hydrogen atom, a C1-C30 alkyl group, a C1-C30 alkoxy group, a C6-C30 aryl group, a C6-C30 aryloxy group, a C3-C30 heteroaryl group, a C3-C30 heteroaryloxy group, a C4-C30 cycloalkyl group, and a C3-C30 heterocycloalkyl group.

8. The composite electrode of claim 1, wherein the polymer represented by Formula 1 is a polymer represented by Formula 1a:

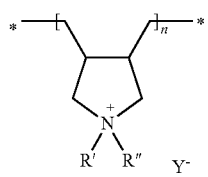

Formula 1a wherein, in Formula 1a,
R' and R" are, each independently, selected from a hydrogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, and an unsubstituted or substituted C3-C30 heterocycloalkyl group;

$Y^-$ is at least one selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, and $(CF_3SO_2)_2N^-$, and n is an integer of 500 to 2,800.

9. The composite electrode of claim 8, wherein the polymer represented by Formula 1a is a polymer represented by Formula 1b:

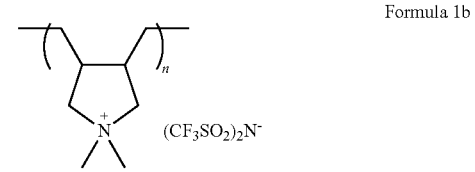

Formula 1b wherein, in Formula 1b, n is an integer of 500 to 2,800.

10. The composite electrode of claim 1, wherein the second heteroatom-containing ionic liquid comprises a cation selected from a cation represented by Formula 3:

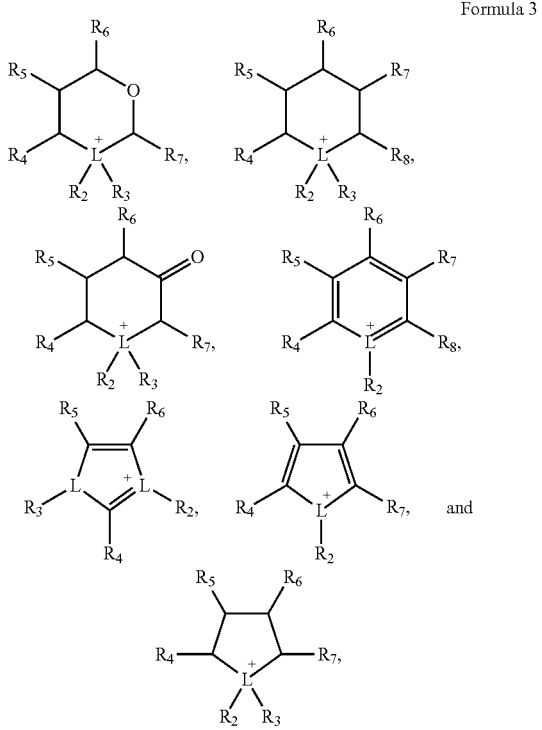

Formula 3 wherein, in Formula 3,

L is N or P; and $R_2$ to $R_8$ are, each independently, a hydrogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, and an unsubstituted or substituted C3-C30 heterocycloalkyl group.

11. The composite electrode of claim 1, wherein the second heteroatom-containing ionic liquid is a compound represented by Formula 3a:

Formula 3a wherein, in Formula 3a,

R' and R" are, each independently, selected from a hydrogen atom, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, and an unsubstituted or substituted C3-C30 heterocycloalkyl group; and $Y^-$ is at least one selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, and $(CF_3SO_2)_2N^-$.

12. The composite electrode of claim 1, wherein the second heteroatom-containing ionic liquid is a compound represented by Formula 3b:

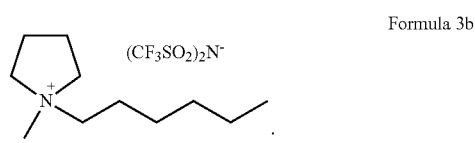

Formula 3b

13. The composite electrode of claim 1, wherein a content of i) the polymerization product of the first heteroatom-containing ionic liquid, or ii) the combination of the second heteroatom-containing ionic liquid and the polymer ionic liquid represented by Formula 1, is about 20 parts to about 90 parts by weight, based on 100 parts by weight of the composite electrode.

14. The composite electrode of claim 13, wherein the composite electrode contains a mixture of the second heteroatom-containing ionic liquid and the polymer ionic liquid represented by Formula 1, wherein a content of the second heteroatom-containing ionic liquid is about 10 parts to about 90 parts by weight, based on 100 parts by weight of the mixture of the second heteroatom-containing ionic liquid and the polymer ionic liquid represented by Formula 1.

15. The composite electrode of claim 1, wherein the composite electrode further comprises at least one selected from a lithium salt, a conductive material, and a binder.

16. A lithium air battery comprising the composite electrode of claim 1.

17. A composite electrode for a lithium air battery, the composite electrode comprising:

a polymerization product of a first heteroatom-containing ionic liquid represented by Formula 2 or Formula 2a:

Formula 2

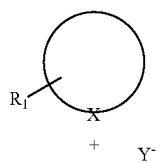
+ Y⁻ wherein, in Formula 2,

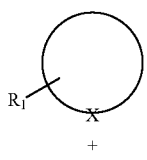
+ is a cation selected from cations represented by Formula 3:

Formula 3

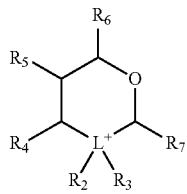 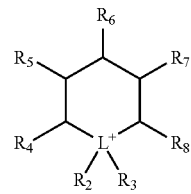

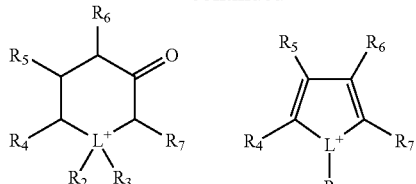

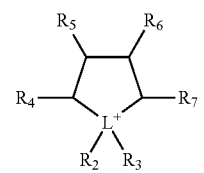

wherein, in Formula 3,
L is N or P;
at least one of $R_2$ to $R_8$ is a C2-C10 alkenyl group,
the unselected rest of $R_2$ to $R_8$ are, each independently, selected from a hydrogen atom, an unsubstituted or substituted C1-C30 alkyl group, an unsubstituted or substituted C2-C30 alkenyl group, an unsubstituted or substituted C2-C30 alkynyl group, an unsubstituted or substituted C1-C30 alkoxy group, an unsubstituted or substituted C6-C30 aryl group, an unsubstituted or substituted C6-C30 aryloxy group, an unsubstituted or substituted C3-C30 heteroaryl group, an unsubstituted or substituted C3-C30 heteroaryloxy group, an unsubstituted or substituted C4-C30 cycloalkyl group, and an unsubstituted or substituted C3-C30 heterocycloalkyl group.

* * * * *